United States Patent [19]

Mori et al.

[11] 3,721,896

[45] March 20, 1973

[54] IMPROVED PHASE SENSITIVE EDDY CURRENT DEFECT DETECTOR UTILIZING FREQUENCY DOUBLING OF DETECTED SIGNAL PRIOR TO PHASE DETECTION

[75] Inventors: Toshihiro Mori, Kohoku-ku, Yokohama; Seigo Ando, Kawaski, both of Japan

[73] Assignee: Nippon Kokan Kabushiki Kaisha, Tokyo, Japan

[22] Filed: Dec. 23, 1971

[21] Appl. No.: 211,222

[52] U.S. Cl. .................................... 324/37, 324/40
[51] Int. Cl. ............................................ G01r 33/12
[58] Field of Search ............................... 324/37, 40

[56] References Cited

UNITED STATES PATENTS 3,535,625  10/1970  Pratt .................................. 324/37

OTHER PUBLICATIONS

Stanford & Fearon; Progress in Nondestructive Testing; Vol. 1 Heywood & Cooper; London; 1958; pp. 89–93

*Primary Examiner*—Robert J. Corcoran
*Attorney*—Robert D. Flynn et al.

[57] ABSTRACT

In an eddy current defect detector of the type wherein a bridge detector energized by an oscillator is used to convert the impedance variation of a detecting coil into an electrical signal in accordance with a defect of an object being examined, there is provided a frequency doubler for doubling the frequency of the output from the bridge detector, means to shift the phase of the output of the oscillator by a predetermined angle and double the frequency thereby producing a reference phase signal, and means for sychronously rectifying the output from the frequency doubler by using the reference phase signal.

6 Claims, 4 Drawing Figures

IMPROVED PHASE SENSITIVE EDDY CURRENT DEFECT DETECTOR UTILIZING FREQUENCY DOUBLING OF DETECTED SIGNAL PRIOR TO PHASE DETECTION

This invention relates to an eddy current defect detector, a type of non-destructive testing apparatus, and more particularly to a highly sensitive eddy current defect detector wherein the presence and absence of a defect in an object to be tested is tested by performing a phase analysis by using a synchronous rectifier.

To test for the presence or absence of a defect in a magnetizable article, for example an iron or steel pipe, an eddy current defect detector is generally used wherein the pipe is passed through a detection coil, the impedance variation of the coil due to the presence of the defect is detected as a phase variation created in an electrical signal flowing through the detector coil and an output corresponding to the difference between the phase of the electrical signal and a reference phase is derived out from a synchronous rectifier circuit. Since the magnitude of the impedance variation of the detection coil caused by the defect varies dependent upon the condition of the defect, a defective pipe can be detected when the phase difference becomes zero, that is when the output from the synchronous rectifier circuit becomes maximum, if the detector were preset such that the phase of the output of the detection coil corresponding to the defect which causes a maximum impedance variation, the largest crack which might appear on the iron pipe for example would match with the phase of the reference signal. However, defects of iron vary over a wide range, that is from a crack for which reason the pipe should be rejected, to a slight depression or a surface irregularity for which reason the pipe should not be rejected as being inferior goods. Since such difference in the degree of defects can be detected in terms of the phase difference in the output signal, it is possible to determine the accuracy of detection and directivity of the eddy current fault detector by the magnitude of the output from the synchronous rectifier in response to the magnitude of the phase difference. However, the relationship between the phase difference and the output (the maximum value thereof being denoted as unity) from the synchronous rectifier is generally shown by table 1.

TABLE 1

| Phase difference (degree) | Output |
| --- | --- |
| 0 | 1 |
| 30 | 0.87 |
| 45 | 0.71 |
| 60 | 0.50 |
| 70 | 0.34 |
| 80 | 0.17 |
| 90 | 0 |

As can be noted from table 1, in order to discriminate satisfactory products from inferior products it is desirable that the phase difference between electric signals corresponding to the satisfactory and inferior products is nearly equal to 90°. Actually, however, dependent upon the condition of the defect, the phase difference amounts to from 45° to 60° (when expressed in terms of the output from 0.71 to 0.50) in most cases. In this manner, with the prior art eddy current defect detector, the difference in the magnitude of the signals representing the inferior products and satisfactory products, respectively is not large, so that the phase angle discriminating ability of the synchronous rectifier is not sufficiently high with the result that satisfactory products are often misjudged as inferior products especially when the level of the signals representing satisfactory products is high.

SUMMARY OF THE INVENTION

Accordingly, it is an object of this invention to provide an eddy current defect detector capable of very accurately discriminating phase angle differences to thereby discriminate inferior products from satisfactory products. Another object of this invention is to provide an improved eddy current defect detector having an improved stability and linearity.

According to this invention there is provided an eddy current defect detector which has a high phase angle discriminating ability comprising a detecting signal oscillator, a bridge detector constructed to vary the phase of the detecting signal from the oscillator in accordance with a defect in an object being examined, a frequency doubler for doubling the frequency of the output signal from the bridge detector, means to shift the phase of the detecting signal by a predetermined angle and double the frequency of the detecting signal to thereby form a reference phase signal, and means for synchronously rectifying the output from the frequency doubler by using the reference phase signal.

The present invention can be more fully understood from the following detailed description when taken in conjunction with the appended drawing, in which.

Figure 1:
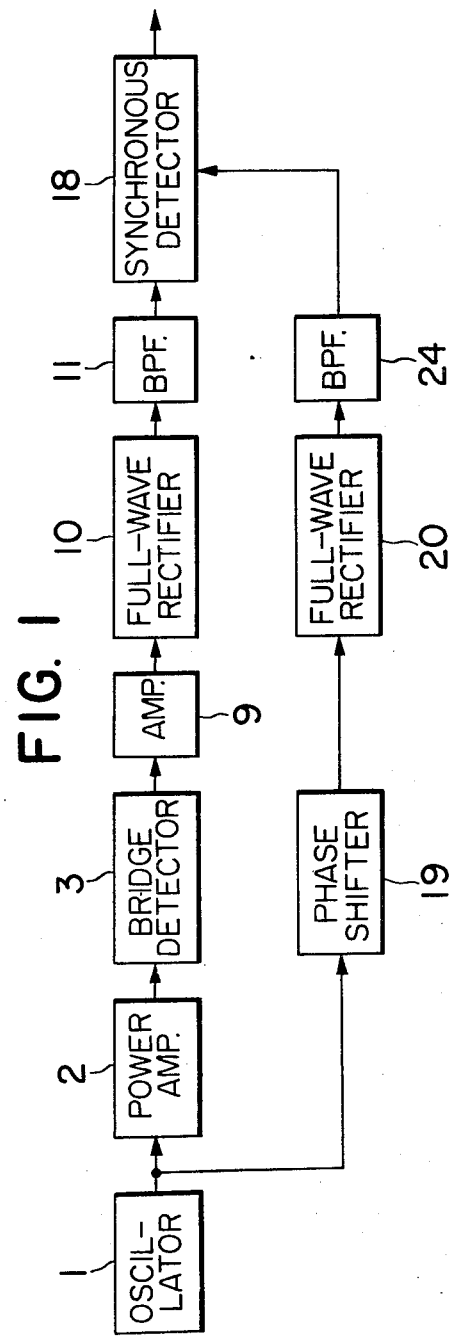
FIG. 1 shows a connection diagram of one example of the eddy current defect detector embodying the invention.

Referring now to FIG. 1, the eddy current defect detector shown therein comprises an oscillator 1 which produces an AC detecting signal having a frequency most suitable for eddy current defect detection, for example 1 $KH_z$ to 30 $KH_z$. The detection signal is supplied to the input terminal of a bridge detector 3 through a power amplifier 2. The bridge detector 3 functions to vary the phase of the detection signal in accordance with a defect of the product being examined.

Figure 2:
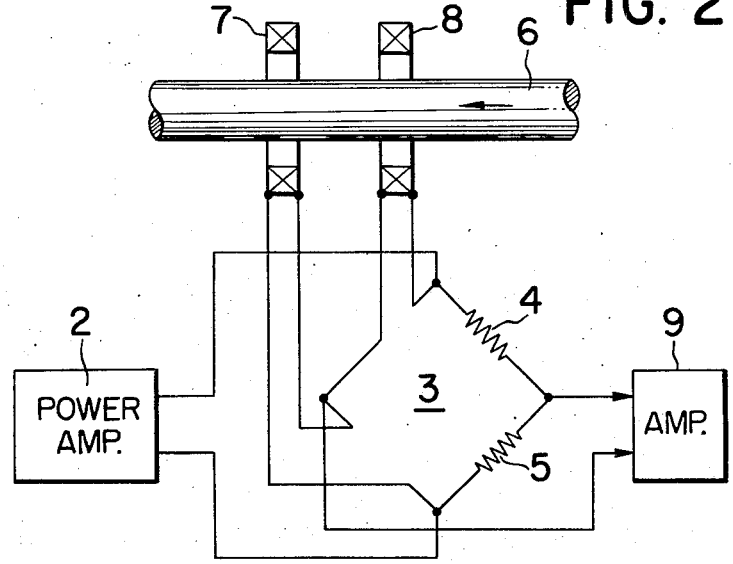
FIG. 2 shows one example of the bridge detector shown in FIG. 1.

As shown in FIG. 2, the bridge detector 3 comprises a pair of detecting coils 7 and 8 and a pair of impedances 4 and 5 which are connected in a bridge circuit. An iron pipe 6 to be examined is passed through detecting coils 7 and 8. When the pipe 6 is made of homogeneous material and does not contain any defect, the bridge 3 is balanced and no output is applied to an amplifier 9. However, when the pipe 6 contains one or more defects the impedance of either one or both of the detecting coils 7 and 8 will vary to provide an output to amplifier 9. The phase angle of the bridge output varies dependent upon the condition of the defect.

Referring back to FIG. 1, the output from amplifier 9 is rectified by a full-wave rectifier 10, and the output thereof is applied to a band-pass filter 11 to provide a signal having a frequency twice the frequency of the rectifier output.

Figure 3:
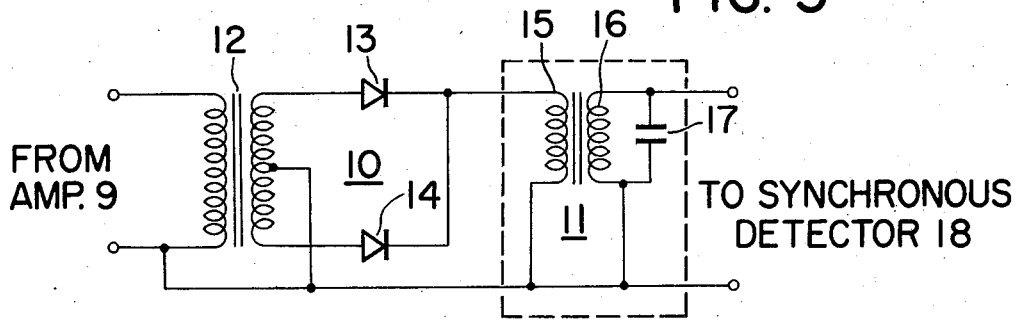
FIG. 3 shows a connection diagram of the full-wave rectifier and the band-pass filter utilized in the circuit shown in FIG. 1.

As shown in FIG. 3, the full-wave rectifier 10 comprises a transformer 12 and a pair of diodes 13 and 14 respectively connected to the opposite terminals of the secondary winding of transformer 12. The rectifier output is taken out across the juncture between diodes 13 and 14 and the juncture between the center tap of the secondary winding and the grounded terminal of the primary winding and is applied across the primary winding 15 of band-pass filter 11.

The harmonics of the output from full-wave rectifier 10 are analyzed according to the following equation.

$\cos\omega t = 2/\pi + 4/\pi \ (1/3) \cos2\omega t - (1/15) \cos4\omega t + (1/35) \cos6\omega t \ldots$ In this equation, it is easy to eliminate the fourth and sixth harmonics and the DC component to thereby extract a $\cos 2\omega t$ component alone. Since the magnitude of $\cos2\omega t$ is equal to $0.424 \times \cos\omega t$, it is possible to use $\cos 2\omega\ t$ as a measuring parameter. Of course, the phase difference at $\cos 2 \ \omega t$ is twice as large as the phase difference at $\cos\omega t$.

As shown in FIG. 3, the band-pass filter 11 comprises a primary winding 15 and a resonance circuit constituted by a secondary winding 16 inductively coupled to primary winding 15 and a parallel capacitor 17. The tuned frequency of the resonance circuit is set to be equal to twice the frequency of the output from amplifier 9. The frequency doubled signal from bandpass filter 11 is applied to a synchronous detector 18.

A portion of the output signal from oscillator 1 is also applied to a phase shifter 19 which shifts the phase of the oscillator output signal by a predetermined angle. The degree of phase shift is predetermined to be substantially equal to the degree of phase shift given by bridge detector 3 to a signal corresponding to a defect of a magnitude which renders the product to be defective.

Figure 4:
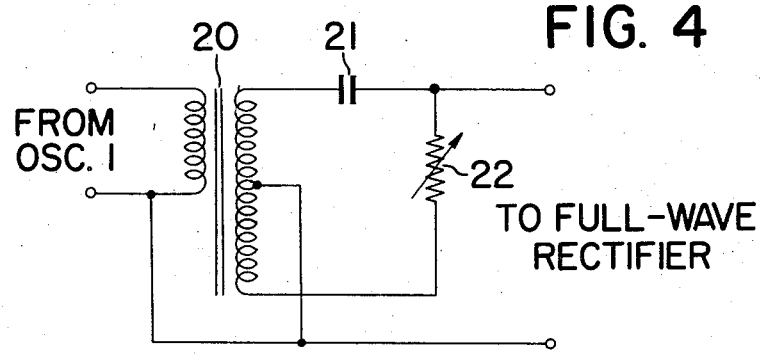
FIG. 4 shows one example of the phase shifter used in the circuit shown in FIG. 1.

As shown in FIG. 4 phase shifter 19 comprises a capacitor 21 connected to one terminal of the secondary winding of a transformer 20 and a variable resistor 22 connected to the other terminal of the secondary winding. The output of the phase 19 appears across the juncture between capacitor 21 and resistor 22 and the juncture between the center tap of the secondary winding and the grounded terminal of the primary winding. The amount of phase shift can be varied from 0° to 180°. More particularly, when the resistor 22 is adjusted to a resistance value of zero the phase is shifted 180°, whereas when the resistance value is infinity, the phase shift is zero. Thus, any desired value of phase shift between 0° to 180° can be obtained by the adjustment of variable resistor 22. The output of the phase shifter 19 is then supplied to a band-pass filter 24 through a full-wave rectifier 23 which have the same construction as band-pass filter 11 and full-wave rectifier 10, respectively. Thus, band-pass filter 24 provides a signal of the reference phase having a frequency twice that of the output signal from phase shifter 19.

This reference phase signal is applied to synchronous rectifier 18 where this signal is used to synchronously rectify the output from band-pass filter 11 to produce an output proportional to the cosine of the phase difference between two input signals. The synchronous rectifier 18 used herein is well known in the art. See for example Robert C. McMaster "Nondestructive Testing Handbook" pp. 40.38 to 40.42, published by The Ronald Press Company (1959), New York.

As above described, since the frequencies of the detected signal and reference phase signal are doubled respectively by the action of full-wave rectifiers 10 and 23 and band-pass filters 11 and 24, the actual phase difference between two inputs to the synchronous rectifier 18 is twice that between the outputs of phase shifter 19 and amplifier 9. Taking the phase of the output from band-pass filter 24 as the reference, the phase of the output from band-pass filter 11 is twice as larger.

In this manner, the ratio of the output from the synchronous rectifier 18 to the input phase difference is greatly improved as shown in following table 2. This means that the eddy current defect detector embodying the invention is highly directive relative to the phase difference, thereby resulting in an eddy current detector having a high sensitivity to phase differences.

TABLE 2

| Phase difference (degrees) | Output of prior detector | Output of this invention |
| --- | --- | --- |
| 0 | 1.0 | 1.0 |
| 20 | 0.94 | 0.77 |
| 30 | 0.87 | 0.5 |
| 40 | 0.77 | 0.17 |
| 45 | 0.71 | 0 |
| 60 | 0.50 | −0.5 |
| 80 | 0.17 | −0.94 |
| 90 | 0 | −1.0 |

It is to be understood that the negative outputs appearing at angles larger than a 45° difference are treated as zero.

In the embodiment shown in FIG. 1, it is advantageous to include an oscilloscope in a stage succeeding amplifier 9 and band-pass filter 11 to observe the phase difference of the signal of fundamental frequency or double frequency.

In the circuit shown in FIG. 1, while the output from full-wave rectifier 23 is applied to band-pass filter 24, it is possible to substitute a Schmidt circuit for the band-pass filter for obtaining a rectangular wave of double frequency, because a rectangular wave is more advantageous than a sine wave as the reference phase signal to the synchronous rectifier 18.

As above described, the invention provides a highly sensitive eddy current defect detector by merely adding a full-wave rectifier and a band-pass filter or a Schmidt circuit to the conventional circuit. This does not cause any substantial increase in the cost, yet it is possible to improve stability. Moreover the linearity of the operating characteristic can be improved because it is necessary to shift the phase of the reference phase signal by only one half of that required by the prior art defect detector.

What we claim is:

1. A phase analyzing type eddy current defect detector comprising:
    an oscillator;
    a bridge detector for varying the phase of the signal from said oscillator in accordance with a defect in an object being examined;
    a first frequency doubler for doubling the frequency of the output signal from said bridge detector;

a reference phase signal generating means including means for shifting the phase of the detecting signal from said oscillator by a predetermined angle and a reference signal frequency doubling means for doubling the frequency of the signal from said oscillator to thereby form a phase shifted, frequency doubled, reference phase signal; and means responsive to said reference phase signal and to the output of said first frequency doubler for synchronously rectifying the output from said frequency doubler by using said reference phase signal.

2. The eddy current defect detector according to claim 1 wherein said bridge detector comprises first and second arms respectively including two detecting coils juxtaposed along the path of an object being examined and third and fourth impedance arms respectively opposing said detecting coils.

3. The eddy current defect detector according to claim 1 wherein said phase shifting means comprises a transformer including a primary winding receiving an input signal from said oscillator and a secondary winding, a capacitor connected at one side to one terminal of said secondary winding and a variable resistor connected between the other terminal of said secondary winding and the other side of said capacitor, and wherein the degree of phase shift is varied by varying said variable resistor.

4. The eddy current defect detector according to claim 1 wherein said first frequency doubler comprises a full-wave rectifier for rectifying the output signal from said bridge detector and a band-pass filter for deriving a component having a frequency twice that of the signal from the output from said full-wave rectifier.

5. The eddy current defect detector according to claim 1 wherein said phase shifting means of said reference phase signal generating means is coupled to the output of said oscillator, and said reference signal frequency doubling means is coupled to the output of said phase shifting means to provide said reference phase signal.

6. The eddy current defect detector according to claim 1 wherein said reference signal frequency doubling means comprises a full-wave rectifier for rectifying the output signal from said phase shifter and a band-pass filter for deriving a component having a frequency twice that of the oscillator signal.

* * * * *